(12) United States Patent
Da Pont et al.

(10) Patent No.: US 9,140,378 B2
(45) Date of Patent: Sep. 22, 2015

(54) ELECTRIC VALVE DEVICE

(75) Inventors: Paolo Da Pont, Turin (IT); Paolo Ravedati, Moncalieri (IT); Giosuè Capizzi, Buttigliera Alta (IT); Maurizio Rendesi, Villarbasse (IT); Fabrizio Paris, Druento (IT); Roberto Bosio, Turin (IT); Massimo Davi, Bussoleno (IT)

(73) Assignee: ELBI INTERNATIONAL S.P.A., Turin (IT)

( * ) Notice: Subject to any disclaimer, the term of this patent is extended or adjusted under 35 U.S.C. 154(b) by 0 days.

(21) Appl. No.: 13/579,759

(22) PCT Filed: Feb. 22, 2011

(86) PCT No.: PCT/IB2011/050721
§ 371 (c)(1),
(2), (4) Date: Aug. 17, 2012

(87) PCT Pub. No.: WO2011/101832
PCT Pub. Date: Aug. 25, 2011

(65) Prior Publication Data
US 2012/0313021 A1 Dec. 13, 2012

(30) Foreign Application Priority Data
Feb. 22, 2010 (IT) .............................. TO2010A0129

(51) Int. Cl.
*F16K 31/12* (2006.01)
*F16K 31/40* (2006.01)
(52) U.S. Cl.
CPC .................................... *F16K 31/402* (2013.01)
(58) Field of Classification Search
CPC ............................... F16K 31/02; F16K 31/402

USPC .............................. 251/301.01, 30.02, 30.01
See application file for complete search history.

(56) References Cited

U.S. PATENT DOCUMENTS

| | | | | |
|---|---|---|---|---|
| 1,961,599 A | * | 6/1934 | Schwitzer et al. | 251/14 |
| 2,990,155 A | * | 6/1961 | Selinder | 251/30.03 |
| 3,082,359 A | * | 3/1963 | Mangiafico et al. | 335/261 |

(Continued)

FOREIGN PATENT DOCUMENTS

WO 03/056222 A1 7/2003

OTHER PUBLICATIONS

International Search Report of PCT/IB2011/050721 dated Oct. 28, 2011.

*Primary Examiner* — John K Fristoe, Jr.
*Assistant Examiner* — Umashankar Venkatesan
(74) *Attorney, Agent, or Firm* — Sughrue Mion, PLLC

(57) ABSTRACT

An electric valve device including a body having an inlet and an outlet, and a main valve seat through which the fluid can flow from the inlet to the outlet, a main shutter movable with respect to the valve seat; a control chamber; first and second communication passages between the inlet and the control chamber and between the control chamber and the outlet, respectively; a fixed structure arranged in the control chamber and in which there is defined an auxiliary valve seat, which is coaxial with the main valve seat (8) and which communicates with said second passage; and a solenoid control valve including a control solenoid coaxial with the valve seats for controlling an auxiliary shutter mounted movably in the control chamber and cooperating with the auxiliary valve seat for controlling the communication between the control chamber and the second passage.

6 Claims, 2 Drawing Sheets

(56) References Cited

U.S. PATENT DOCUMENTS

| | | | |
|---|---|---|---|
| 3,439,895 A * | 4/1969 | Ali | 251/30.02 |
| 3,458,769 A * | 7/1969 | Stampfli | 361/147 |
| 4,046,351 A * | 9/1977 | Lang | 251/129.17 |
| 4,178,573 A * | 12/1979 | Swanson | 335/255 |
| 4,531,547 A * | 7/1985 | Hadden | 137/625.64 |
| 4,717,116 A * | 1/1988 | Ishigaki | 251/30.02 |
| 6,290,203 B1 | 9/2001 | Kolze | |
| 6,749,136 B1 | 6/2004 | Wilson et al. | |
| 6,869,060 B2 * | 3/2005 | Barber et al. | 251/30.02 |

\* cited by examiner

ELECTRIC VALVE DEVICE

CROSS REFERENCE TO RELATED APPLICATIONS

This application is a National Stage of International Application No. PCT/IB2011/050721 filed Feb. 22, 2011, claiming priority based on Italian Patent Application No. TO2010A000129 filed Feb. 22, 2010, the contents of all of which are incorporated herein by reference in their entirety.

The present invention relates to an electric valve device.

More specifically, the invention relates to an electric valve device of the type comprising a main valve, operation of which is controlled by means of an associated auxiliary electric valve or pilot electric valve.

An object of the present invention is to provide such an improved electric valve device.

As will emerge more clearly from the description below, this object, together with others, is achieved according to the invention with an electric valve device comprising:
- a body having an inlet and an outlet for the fluid, and a main valve seat through which the fluid can flow from the inlet to the outlet,
- a main shutter movable with respect to said valve seat between a position for closing and a position for opening said seat;
- a control chamber defined within the body and delimited in part by the main shutter,
- at least one first and one second communication passage between the inlet and the control chamber and between the control chamber and the outlet, respectively;
- a fixed structure which is arranged in the control chamber and in which there is defined an auxiliary valve seat, which is coaxial with the main valve seat and which communicates with said second passage; and
- a solenoid control valve, including a control solenoid arranged coaxially with said main and auxiliary valve seats, for controlling an auxiliary shutter mounted movably in the control chamber and cooperating with the auxiliary valve seat, for controlling the communication between the control chamber and said second passage.

Figure 1:
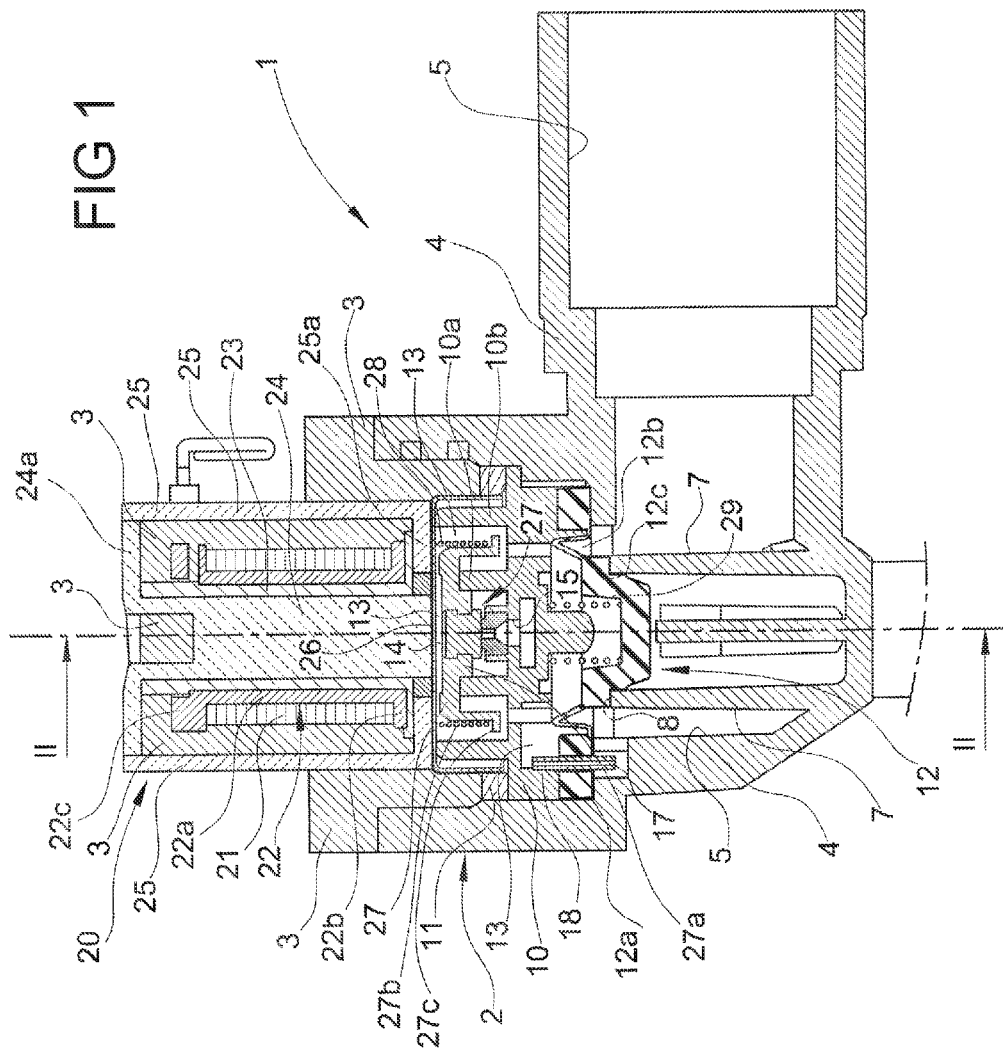
Figure 2:
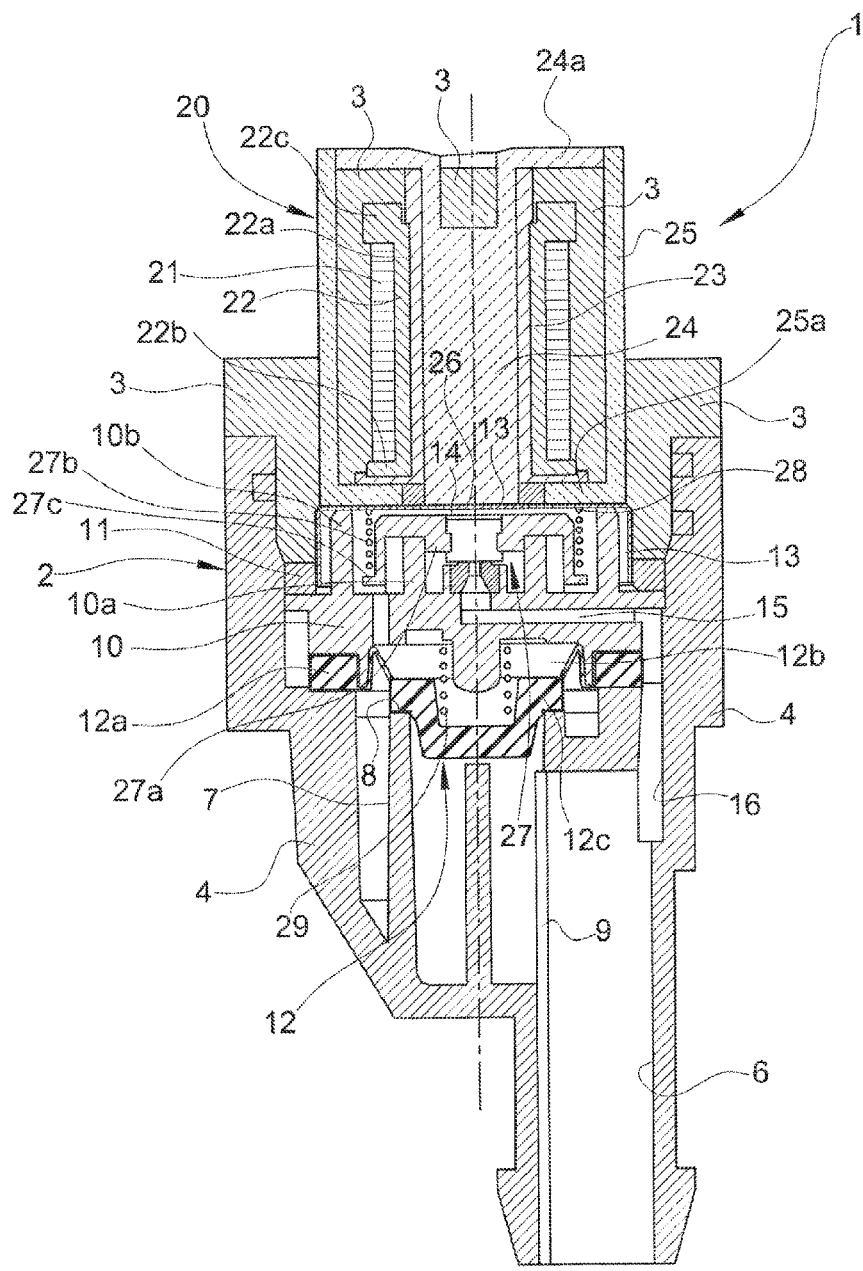

Further characteristic features and advantages of the invention will become clear from the following detailed description provided purely by way of a non-limiting example, with reference to the accompanying drawings in which:

FIG. 1 is a cross-sectional view of an electric valve device according to the present invention; and FIG. 2 is a further view of said electric valve device, cross-sectioned along the line II-II of FIG. 1.

In the figures, 1 denotes in its entirety an electric valve device according to the invention which can be used (for example) to control the water supply from the water mains to a washing machine such as a laundry washing machine or a dishwashing machine.

The electric valve device 1 comprises a body 2, which is made of moulded plastic and which in the example of embodiment shown in the drawings comprises a top part 3 and a bottom part 4 which are joined together in a fluid-tight manner.

The bottom part 4 of the body 2 is provided with an inlet passage 5 (FIG. 1) for a fluid, typically a hydraulic fluid, as well as an outlet passage 6 for said fluid.

In the example of embodiment shown the passages 5 and 6 extend in directions substantially perpendicular to each other, but said arrangement is not obligatory in any way. In other embodiments not shown these passages could be, for example, aligned with each other.

With reference to FIG. 1, an essentially tubular formation 7, which defines a main valve seat 8 at the top, is provided inside the inlet passage 5.

As can be seen in FIG. 2, the region inside the tubular formation 7 and the valve seat 8 communicates, via an opening 9, with the outlet passage 6.

Via the valve seat 8 a fluid is able to flow from the inlet 5 to the outlet 6.

A fixed structure 10 is located between the portions 3 and 4 of the body 2, being arranged between a sealing ring 11 and the radially peripheral portion 12a of a membrane which is denoted overall by 12. Said membrane 12 comprises a flexible intermediate annular portion 12b which connects the peripheral portion 12a with a thicker central portion 12c intended to act as a main shutter cooperating with the valve seat 8.

The fixed structure 10 is contained inside a control chamber 13 which is delimited partly by the membrane 12 and partly by the portions 3 and 4 of the body 2 of the electric valve device.

The fixed structure 10 has in its top part an auxiliary valve seat 14 which is coaxial with the main valve seat 8. A passage 15 terminates at this seat, said passage being formed inside the fixed structure 10 and communicating with a passage 16 (FIG. 2) formed in the bottom portion 4 of the body 2. The passage 16 in turn emerges inside the outlet passage 6.

With reference to FIG. 1, a passage 17 is formed between the portion of the inlet passage 5 surrounding the tubular formation 7 and the control chamber 13. In the embodiment shown this passage 17 is formed by means of a small tube 18 which passes through a corresponding through-hole provided in the peripheral annular portion 12a of the membrane 12.

Owing to the passage 17, the control chamber 13 is permanently in communication with the inlet passage 5 of the electric valve device.

As an alternative to the embodiment shown in the drawings, the permanent communication between the inlet 5 and the control chamber 13 may be achieved by means of one or more passages provided in the membrane 12 and/or in the body 2.

The electric valve device 1 also comprises a solenoid control valve denoted overall by 20. Said solenoid valve 20 comprises a winding or control solenoid 21 which is wound onto a reel 22 of electrically insulating material which comprises an intermediate tubular portion 22a terminating in end flanges 22b and 22c.

A bush 23 of electrically insulating material is mounted inside the tubular portion 22a of the reel 22.

The solenoid 21 is coaxial with the main valve seat 8 and auxiliary valve seat 14.

The solenoid 21 has, associated therewith, a magnetic circuit which in the embodiment shown comprises a central fixed core 24 which is situated inside said solenoid and the bottom end of which extends close to the control chamber 13. The top end of the core 24 has an annular formation which protrudes radially outwards and is denoted by 24a.

The magnetic circuit associated with the solenoid 21 comprises an essentially cylindrical skirt 25, the top end of which is adjacent to the formation 24a of the core 24 and the bottom end of which has a formation 25a protruding radially inwards and extending into the vicinity of the bottom end of the core 24 from which it is separated by a predetermined radial distance.

The assembly formed by the solenoid 21, the reel 22 and the bush 23 as well as the magnetic circuit 24, 25 is incorporated, during moulding, in the top portion 3 of the body 2. This assembly is separated, in a liquid-tight manner, from the control chamber 13 by means of a thin element 26 made of a good heat-conducting material, such as stainless steel. Conveniently, this element 26 may also be incorporated in the top portion 3 of the body during the moulding operation.

The solenoid control valve 20 also comprises an auxiliary movable shutter 27 operationally cooperating with the auxiliary valve seat 14 for controlling communication between the control chamber 13 and the outlet passage 6.

The fixed structure 10 on the side facing the auxiliary shutter 27 has a first annular protruding formation 10a which is coaxial with the control solenoid 21 and surrounds the auxiliary valve seat 14.

The fixed structure 10 has a further annular protruding formation 10b which is coaxial with and surrounds the formation 10a.

The auxiliary shutter 27 is essentially shaped in the manner of an overturned cup with a raised portion 27a which protrudes from the bottom wall thereof and which extends with a limited amount of play inside the annular formation 10a of the fixed structure 10. This shutter 27 moreover has a peripheral skirt portion 27b which extends around the formation 10a, inside the formation 10b of the fixed structure 10.

The shutter 27 also has a formation 27c which protrudes radially towards the outside from the distal end of the lateral wall 27b thereof.

A helical spring 28 tends to urge the auxiliary shutter 27 towards the auxiliary valve seat 14. This spring 28 is arranged around the skirt portion 27b of the shutter 27 and engages with its radially protruding formation 27c.

The arrangement is such that the auxiliary shutter 27 extends at a very small distance, for example a few tenths of a millimeter, from the stainless steel element 26. Consequently, the energy needed to energize the solenoid 21 in order to raise the shutter 27 from the associated seat 14 is very small.

It is pointed out moreover that, since the auxiliary seat 14 is fixed, the operating stroke of the auxiliary shutter 27 is independent of the operating stroke of the main shutter 12c associated with the main valve seat 8.

The particular form of the fixed structure 10 is such that the liquid which reaches and flows during operation through the control chamber 13 contacts the stainless steel element 26 which is in close contact with the assembly including the control solenoid 21. Cooling of said solenoid and the associated magnetic circuit is thus favoured by the liquid flowing inside the control chamber 13.

Particularly convenient is the location of the small tube 18 (forming the passage 17 between the inlet 5 and the control chamber 13) in a "calm" zone, i.e. a zone substantially not affected by the liquid flow when the main valve is open.

The control solenoid 21 is surrounded completely by at least two elements or layers of material which is electrically insulating (double electrical insulation). It is located moreover in a zone which is separated, in a liquid-tight manner, from the control chamber 13.

During use, when the main valve 8, 12 is closed and the solenoid 21 is de-energized, the chamber 13 is filled by the fluid supplied to the inlet passage 5 since this chamber communicates permanently with said inlet 5 via the passage 17. The auxiliary or pilot valve formed by the seat 14 and by the associated shutter 27 is closed. Therefore, the chamber 13 does not communicate with the outlet passage 6.

In order to cause opening of the main valve and consequently a flow of fluid from the inlet 5 to the outlet 6, the control solenoid 21 is energized. Consequently the auxiliary shutter 27 is attracted magnetically towards the fixed core 24 and the bottom end portions 25a of the skirt 25, against the action of the spring 28. The chamber 13 is thus placed in communication with the passage 15 and therefore the outlet passage 5. It is pointed out that in said condition the fluid from the inlet passage 5 to the outlet passage 6 must follow a somewhat winding, essentially labyrinth-like path, in view of the particular interpenetrating configuration of the auxiliary shutter 27 and the associated protruding annular formations 10a and 10b of the fixed structure 10.

The communication between the control chamber 13 and the outlet passage 6 causes a drop in pressure inside said control chamber, such that the thrust exerted by the fluid on the bottom surface of the membrane element 12 manages to cause the movement of this membrane element away from the main valve seat 8 such that communication between the inlet 5 and the outlet 6 is established primarily via the main valve which is now open.

Upon subsequent de-energization of the solenoid 21, the auxiliary shutter 27 is repositioned so as to close the auxiliary seat 14 by the action of the spring 28. The communication between the control chamber 13 and the outlet passage 6 is thus interrupted. The pressure of the fluid inside the control chamber 13 increases until the force exerted on the top surface of the membrane element 12 (if necessary increased by the action of an auxiliary spring 29) repositions the membrane shutter 12 against the main valve seat 8, completely and definitively interrupting communication between the inlet 5 and outlet 6.

Obviously, without affecting the principle of the invention, the embodiments and the constructional details may be significantly modified with respect to that described and illustrated purely by way of a non-limiting example, without thereby departing from the scope of the invention as defined in the accompanying claims.

The invention claimed is:

1. An electric valve device (1), comprising:
   a body (2; 3, 4) having an inlet (5) and an outlet (6) for the fluid, and a main valve seat (8) through which the fluid can flow from the inlet (5) to the outlet (6);
   a main shutter (12) movable with respect to said valve seat (8) between a position for closing and a position for opening said seat (8);
   a control chamber (13) defined within the body (2; 3, 4) and delimited in part by the main shutter (12);
   at least one first and one second communication passage (17; 15, 16) between the inlet (5) and the control chamber (13) and between the control chamber (13) and the outlet (6), respectively;
   a fixed structure (10) which is arranged in the control chamber (13) and inside which there is defined an auxiliary valve seat (14) which is coaxial with said main valve seat (8) and communicates with said second passage (15, 16); and
   a solenoid control valve (20) including a control solenoid (21) having an associated magnetic circuit (24, 25) and arranged coaxially with said valve seats (8, 14), for controlling an auxiliary shutter (27) which is mounted movably in the control chamber (13) and which is intended to cooperate with said auxiliary valve seat (14) for controlling the communication between the control chamber (13) and said second communication passage (15, 16),
   wherein the assembly formed by the solenoid (21) and the associated magnetic circuit (24, 25) is separated in a liquid-tight manner from the control chamber (13) by a thin layer (26) of thermally conducting material, facing the auxiliary shutter (27), the fixed structure (10) being shaped such that the fluid which during use flows into the control chamber (13) contacts said layer (26) of thermally conducting material, wherein said fixed structure (10) on the side facing the control solenoid (21) has a first annular protruding formation (10a) which is coaxial with said solenoid (21) and which surrounds the auxiliary valve seat (14) such as to define therewith a first annular groove, and the distal end of which faces the auxiliary shutter (27), which has a central portion (27a) which extends inside said formation (10a), and wherein said fixed structure (10) has a second annular protruding formation (10b), which is coaxial with and surrounds said first formation (10a) such as to define therewith a second annular groove, and the distal end of which faces an intermediate annular portion of the auxiliary shutter (27), which has a peripheral skirt portion (27b) which extends around said first formation (10a) within said second formation (10b) inside said second annular groove.

2. A device according to claim 1, wherein the control solenoid (21) is fixed to said body (2; 3, 4) with an associated magnetic circuit (24, 25) including a fixed core (24) extending inside the solenoid (21) and having one end which extends close to the control chamber (13), as well as a skirt (25) which surrounds at least in part the solenoid (21); one end of the fixed core (24) and a corresponding end portion (25) of the skirt (25) extending adjacent to the control chamber (13), at a predetermined mutual radial distance.

3. A device according to claim 1, wherein the auxiliary shutter (27) has an associated spring (28) which tends to urge it towards the auxiliary valve seat (14), said spring (28) being arranged around the peripheral skirt portion (27b) of the auxiliary shutter (27) in engagement with a portion (27c) of said shutter (27) which protrudes radially towards the outside from the bottom part of said skirt portion (27b).

4. A device according to claim 1, wherein the auxiliary shutter (27) is essentially cup-shaped.

5. A device according to claim 4, wherein the auxiliary shutter (27) has a raised portion (27a) which protrudes centrally from the internal surface of the bottom wall thereof, and a formation (27c) which protrudes radially towards the outside from the distal end of the lateral wall (27b) thereof.

6. A device according to claim 1, wherein the control solenoid (21) is wound around a tubular reel (22) made of an electrically insulating material and provided with protruding end flanges (22b, 22c); in said reel (22) there being inserted a bush (23), likewise made of an electrically insulating material, inside which the fixed core (24) of the magnetic circuit (24, 25) associated with said solenoid (21) extends; on the assembly formed by the reel (22) and the bush (23) there being overmoulded a casing (3) of electrically insulating material, such that the control solenoid (21) is surrounded by at least two members or layers of electrically insulating material.

\* \* \* \* \*